United States Patent
Rahman et al.

(10) Patent No.: US 10,225,028 B2
(45) Date of Patent: Mar. 5, 2019

(54) ADAPTATION OF DUAL CONNECTIVITY PROCEDURES

(71) Applicant: Telefonaktiebolaget L M Ericsson (publ), Stockholm (SE)

(72) Inventors: Imadur Rahman, Sollentuna (SE); Joakim Axmon, Kävlinge (SE); Muhammad Kazmi, Bromma (SE); Magnus Larsson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 376 days.

(21) Appl. No.: 14/763,237

(22) PCT Filed: May 19, 2015

(86) PCT No.: PCT/SE2015/050561
§ 371 (c)(1),
(2) Date: Jul. 24, 2015

(87) PCT Pub. No.: WO2015/178835
PCT Pub. Date: Nov. 26, 2015

(65) Prior Publication Data
US 2016/0255671 A1 Sep. 1, 2016

Related U.S. Application Data

(60) Provisional application No. 62/000,385, filed on May 19, 2014.

(51) Int. Cl.
*H04W 56/00* (2009.01)
*H04W 72/04* (2009.01)
(Continued)

(52) U.S. Cl.
CPC .......... *H04B 17/364* (2015.01); *H04W 24/08* (2013.01); *H04W 56/001* (2013.01); *H04W 76/15* (2018.02); *H04W 88/06* (2013.01)

(58) Field of Classification Search
CPC ..... H04W 56/00; H04W 72/12; H04W 88/06; H04W 76/025; H04W 24/08;
(Continued)

(56) References Cited

U.S. PATENT DOCUMENTS 8,948,157 B2 * 2/2015 Abchuyeh ............. H04J 3/0638
370/329
9,504,057 B2 * 11/2016 Ahmadi ............ H04W 72/1215
(Continued)

OTHER PUBLICATIONS

3GPP TSG-RAN WG4 #70-BIS "Discussion on the Maximum Received Timing Difference for Dual Connectivity", 2014.*
(Continued)

*Primary Examiner* — Edan Orgad
*Assistant Examiner* — Vanneilian Lalchinthang
(74) *Attorney, Agent, or Firm* — Coats & Bennett, PLLC

(57) ABSTRACT

The embodiments disclosed herein relates to a wireless communication device, network nodes and methods therein for handling multiple connectivity. A method in a network node comprises determining the extent to which a wireless communication device requires different signals received from different non-co-located radio network points to be synchronized in order to operate with multiple connectivity. The method further comprises deciding whether to configure the WCD to operate with multiple connectivity, based on said determination.

23 Claims, 7 Drawing Sheets

(51) Int. Cl.
*H04W 16/32* (2009.01)
*H04B 17/364* (2015.01)
*H04W 24/08* (2009.01)
*H04W 76/15* (2018.01)
*H04W 88/06* (2009.01)

(58) Field of Classification Search
CPC ... H04W 56/001; H04W 76/15; H04W 16/32; H04J 3/0676; H04J 3/0679; H04B 17/364
USPC ......................................................... 370/329
See application file for complete search history.

(56) References Cited

U.S. PATENT DOCUMENTS

| | | | | |
|---|---|---|---|---|
| 2009/0253470 A1* | 10/2009 | Xu | ...................... | H04W 76/048 455/574 |
| 2011/0216757 A1* | 9/2011 | Michel | .................. | H04J 3/0679 370/350 |
| 2012/0309394 A1* | 12/2012 | Radulescu | ........ | H04W 36/0055 455/436 |
| 2014/0192740 A1* | 7/2014 | Ekpenyong | ........... | H04L 5/0035 370/329 |
| 2016/0192304 A1* | 6/2016 | Yi | ........................ | H04B 7/2656 370/311 |
| 2016/0330740 A1* | 11/2016 | Uchino | ............... | H04W 74/006 |

OTHER PUBLICATIONS

Ericsson, "Activation and deactivation of SCells in dual connectivity", 3GPP TSG RAN WG4 Meeting #71, Seoul, Korea, May 19, 2014, pp. 1-3, R4-142724, 3GPP.

Ericsson, "Unsynchronized dual connectivity operation", 3GPP TSG-RAN WG4 Meeting #71-AHon Rel-12 RRM, Beijing, P.R. China, Jun. 24, 2014, pp. 1-5, R4-71AH-0034, 3GPP.

Broadcom Corporation, "Discussion on RRM aspects for DuCo", 3GPP TSG RAN WG4 Meeting #71, Seoul, Korea, May 19, 2014, pp. 1-4, R4-143665, 3GPP.

Alcatel-Lucent, "UE maximum received timing difference for Dual Connectivity", 3GPP TSG RAN WG4 Meeting #71, Seoul, Korea, May 19, 2014, pp. 1-3, R4-142787, 3GPP.

RAN2, "LS on Activation/deactivation for Dual Connectivity", 3GPP TSG-RAN WG2 Meeting #85bis, Valencia, Spain, Mar. 31, 2014, p. 1, R2-141851, 3GPP.

RAN2, "LS on SFN handling in the dual connectivity", 3GPP TSG-RAN WG2 Meeting #85bis, Valencia, Spain, Mar. 31, 2014, pp. 1-2, R2-141849, 3GPP.

Ericsson, "Acquisition of SeNB SFN in the dual connectivity", 3GPP TSG RAN WG4 Meeting #71, Seoul, Korea, May 19, 2014, pp. 1-3, R4-142726, 3GPP.

\* cited by examiner

201: Determining the extent to which a wireless communication device, WCD, requires different signals received from different non-co-located radio network points to be synchronized in order to operate with multiple connectivity 202: Deciding whether to configure the WCD to operate with multiple connectivity, based on said determination.

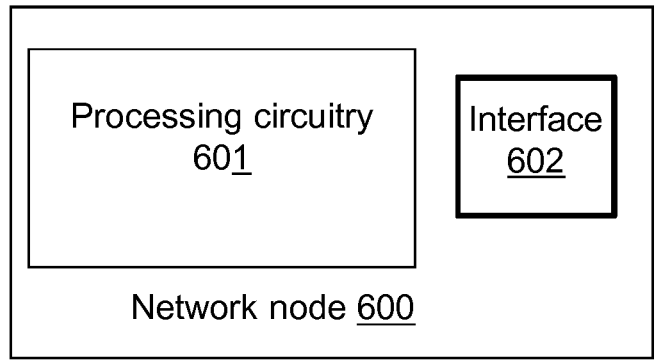
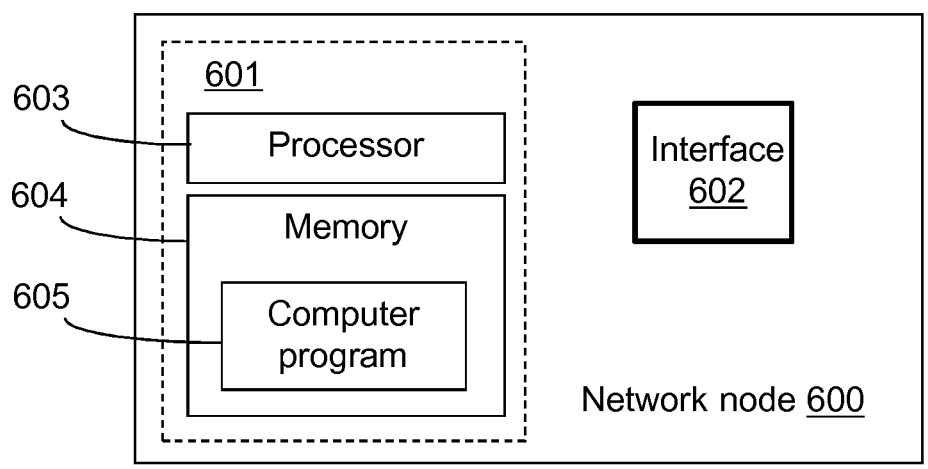
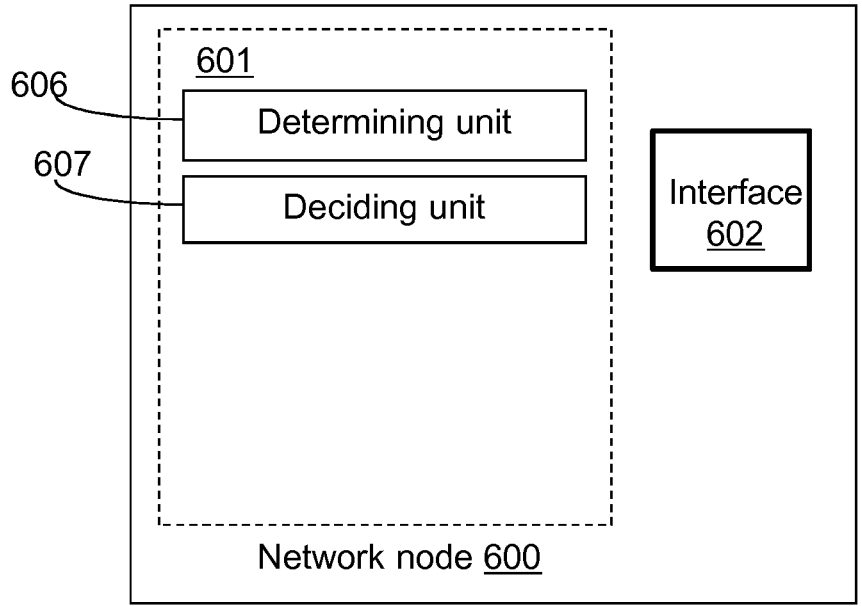

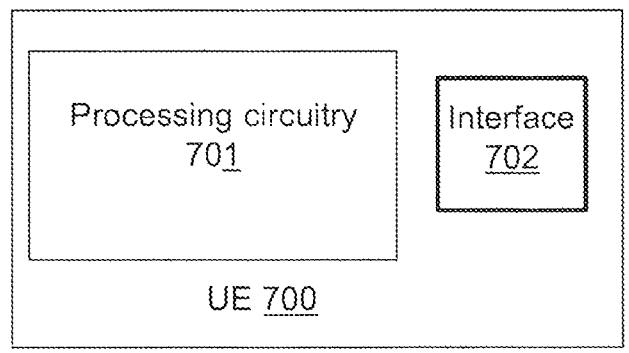
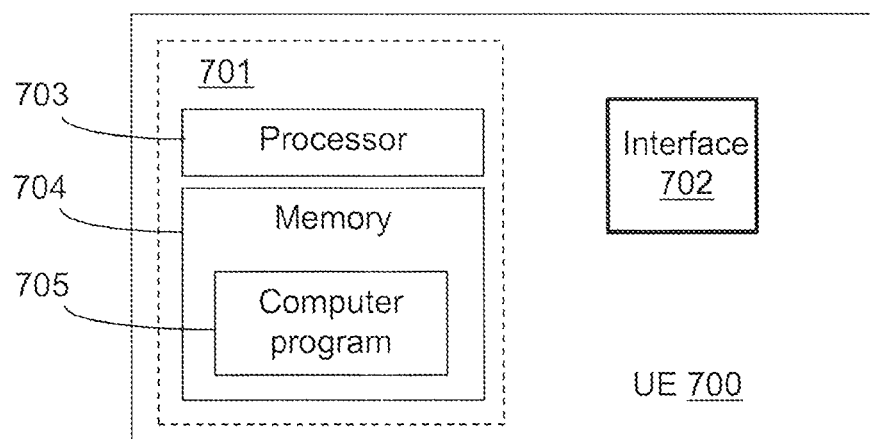
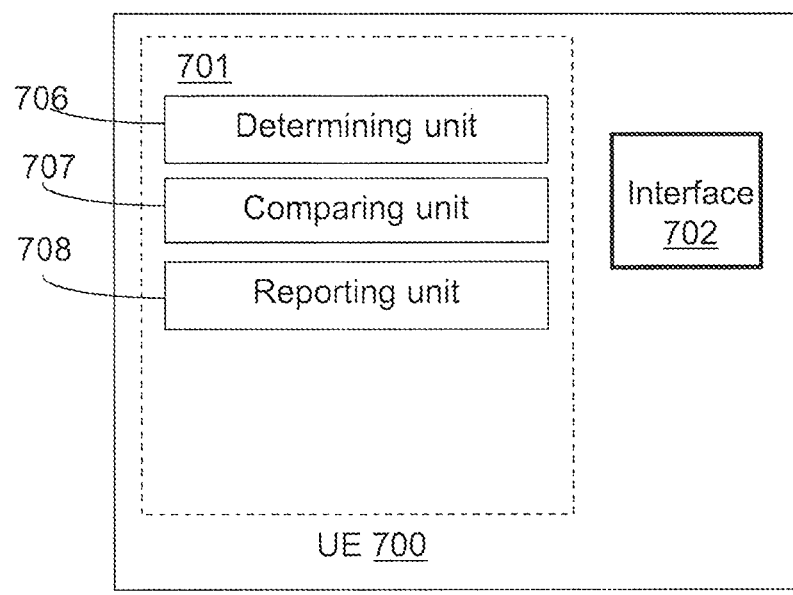

ADAPTATION OF DUAL CONNECTIVITY PROCEDURES

TECHNICAL FIELD

The present application relates generally to dual or multiple connectivity and configuration of the same.

BACKGROUND

A dual connectivity framework is currently being considered for LTE Rel-12. Dual Connectivity refers to the operation where a given UE consumes radio resources provided by at least two different network points (Master eNB, MeNB and Secondary eNB, SeNB) connected with non-ideal backhaul while in RRC_CONNECTED. A UE in dual connectivity maintains simultaneous connections to anchor and booster nodes, where the MeNB is interchangeably called as anchor node and the SeNB is interchangeably called as the booster node. As the name implies, the MeNB controls the connection and handover of SeNB so signaling in MeNB is needed even if SeNB changes. In addition, both the anchor node and booster node can terminate the control plane connection towards the UE and can thus be controlling some of the UE operations independently with respect to termination of the control plane.

The UE reads system information from the anchor node. In addition to the anchor node, the UE may be connected to one or several booster nodes for added user plane support. The MeNB and SeNB are connected via the Xn interface, which is currently selected to be the same as the X2 interface between two eNBs.

Dual connectivity (DC) is a mode of operation of a UE in for example RRC_CONNECTED state, where the UE is configured with a Master Cell Group (MCG) and a Secondary Cell Group (SCG). Cell Group (CG) is a group of serving cells associated with either the MeNB or the SeNB. The MCG and SCG are defined as follows:
  Master Cell Group (MCG) is a group of serving cells associated with the MeNB, comprising of the PCell and optionally one or more SCells.
  Secondary Cell Group (SCG) is a group of serving cells associated with the SeNB comprising of PSCell (Primary Scell) and optionally one or more SCells Master eNB is the eNB which terminates at least S1-MME. Secondary eNB is the eNB that is providing additional radio resources for the UE but is not the Master eNB.

FIG. 1 describes a dual connectivity setup. In this example, only one SeNB is connected to UE, however, more than one SeNB can serve the UE in general. As shown in the figure, it is also clear that dual connectivity is a UE-specific feature and a network node can support a dual connected UE and a legacy UE at the same time.

As mentioned earlier, the anchor node and booster node roles are defined from a UE point of view. This means that a node that acts as an anchor node to one UE may act as booster node to another UE. Similarly, though the UE reads the system information from the anchor node, a node acting as a booster node to one UE, may or may not distribute system information to another UE.

The MeNB may provide system information, terminate control plane and it can also terminate user plane The SeNB, an terminate the control plane but can only terminate the user plane In one application, dual connectivity allows a UE to be connected to two nodes to receive data from both nodes to increase its data rate. This user plane aggregation achieves similar benefits as carrier aggregation using network nodes that are not connected by low-latency backhaul/network connection. Due to this lack of low-latency backhaul, the scheduling and HARQ-ACK feedback from the UE to each of the nodes will need to be performed separately. That is, it's expected the UE shall have two UL transmitters to transmit UL control and data to the connected nodes.

In some examples, the anchor node provides a macro cell while the booster cell provides a lower power (e.g., micro, pico, or femto) cell (at least partially within the coverage area of the macro cell). For instance, the UE connection may be anchored to the macro cell via an anchor carrier while data rate is boosted via a lower power cell through a booster carrier. In this other similar cases, dual connectivity may be termed dual-layer connectivity since the UE has simultaneous connections to both macro and low-power layers. Regardless, the macro cell may provide system information and/or basic RRC signaling (such as paging or mobility related signaling), with all data services (but no system information) being provided by the low-power cell (i.e., the low-power cell is "macro assisted") for that particular UE. In a different use case, though, the macro cell may also provide at least some data services (e.g., lower rate or high reliability data services), whereas the low-power cell provides higher rate data services.

In dual connectivity the UE will be connected to two eNodeBs simultaneously; MeNB and SeNB. Each of them may have one or more associated SCells which may be configured for DL, or DL and UL CA operation. The SCells are time-aligned to the MeNB and SeNB, respectively, but the MeNB and SeNB may or may not be time aligned with respect to their frame timings and/or their respective system frame number (SFN).

MeNB and SeNB independently perform some of the operations and procedures related to the UE in dual connectivity. For example MeNB can only activate and deactivate serving cells (e.g. SCells) associated with MeNB. SeNB can only activate and deactivate serving cells (e.g. SCells) associated with SeNB. Cross-eNB activation/deactivation is not supported.

The configuration and simultaneous activation, as well as release (hence deactivation), of Special SCell also called as Primary Secondary Cell (PSCell) belonging to SeNB is done by MeNB, and hence that the above mentioned agreement shall only refer to SCells associated with MCG and SCG, respectively. The PSCell is responsible for performing operations within SCG for example operations such as configuration, deconfiguration, activation and deactivation of SCell(s) in SCG. Hence, for example, the MeNB configures and activates the Special SCell but not any of the ordinary SCells in the SCG. Similarly the MeNB deactivates and releases the Special SCell but not any of the ordinary SCells in the SCG.

For configuration and simultaneous implicit activation of Special SCell, it shall be noted that the activation time may be considerable longer than currently assumed for legacy CA. The fact that the Special SCell goes directly into activated state upon configuration means that the UE might not have had a chance to identify it before the activation, hence the activation might be blind. Moreover, as suggested in 3GPP (R2-141849) the UE will also have to acquire SFN timing difference to MeNB by reading MIB from the Special SCell as part of the activation procedure, for purpose of aligning e.g. DRX cycle offset and measurement gap offset between MeNB and SeNB. Acquiring SFN adds an extra 50 ms to the activation time (see analysis in R4-142726) both for regular and blind activation of the Special SCell.

For legacy CA (i.e. CA without dual connectivity) the SCell activation times are 24 and 34 ms for regular and blind activation, respectively; 3GPP TS 36.133 section 7.7. For those numbers to apply it is assumed that the SCell has already been configured by the network via RRC Connection Reconfiguration message (3GPP TS 36.331 section 5.3.5) when the MAC control element activating the cell is received (3GPP TS 36.321 section 5.13). Hence for simultaneous configuration and activation also the RRC procedure delay needs to be taken into account—often 15 ms is assumed for such delay.

Blind activation in legacy CA can make use of that it is known that the maximum time difference between any two cells being aggregated shall be within 30.26 ms (3GPP TS 36.300 annex J.1). Hence the UE only has to assume that the cell to be detected is misaligned by at most half an OFDM symbol, which significantly improves and speeds up the cell detection. In case of unsynchronized MeNB and SeNB both with respect to SFN and frame timing, the UE cannot make such assumption, and the cell detection will be similar to cell detection time for blind handover, which under favourable signal conditions is specified to 80 ms (3GPP TS 36.133 section 5.1).

SUMMARY

In dual connectivity (DC) the UE is served from MeNB and SeNB which are not geographically co-located. In DC scenario both synchronized and unsynchronized modes of operation are envisioned. However a UE may or may not support both modes. In synchronized mode the received time difference (RTD) of signals from MeNB and SeNB should be within a threshold. But in unsynchronized mode there is no strict limit on RTD. The MeNB and SeNB will configure the UE with one or more procedures such as DRX, measurement gaps etc, independently. Due to lack of coordination or insufficient coordination for configuring such procedures the UE and/or system performance (e.g. UE battery life) may be degraded.

Moreover, in the existing solutions, many of the RRM solutions, e,g, operation under the DRX cycle, activation/deactivation time of SCell, etc, are mainly defined for synchronized mode of operation and mainly defined in the context of CA without DC. For unsynchronized operation (i.e. when UE may receive signals from MeNB and SeNB at any time instances), uncoordinated DRX cycles between serving cells belonging to MCG and SCG, uncoordinated measurement gaps and so on will result in inefficient operation if the existing solutions devised for synchronized operation are used.

According to a first aspect, a method is provided, which is performed by a network node. The method comprises determining the extent to which a wireless communication device, WCD, requires different signals received from different non-co-located radio network points to be synchronized in order to operate with multiple connectivity. The method further comprises, deciding whether to configure the WCD to operate with multiple connectivity, based on said determination.

According to a second aspect, a method is provided, which is performed by a wireless communication device. The method comprises determining a receive timing difference between signals received at the wireless communication device from a candidate cell and a reference cell. The method further comprises, comparing the receive timing difference with a threshold. The method further comprises, reporting information to a network node about one or more cells whose determined receive timing difference are within the threshold According to a third aspect, a network node is provided, which is operable in a communication network supporting multiple connectivity. The network node being configured to: determine the extent to which a wireless communication device, WCD, requires different signals received from different non-co-located radio network points to be synchronized in order to operate with multiple connectivity; and further to decide whether to configure the WCD to operate with multiple connectivity, based on said determination.

According to a fourth aspect, a wireless communication device is provided, which is operable in a communication network supporting multiple connectivity. The wireless communication device being configured to: determine a receive timing difference between signals received at the wireless communication device from a candidate cell and a reference cell; and further to compare the receive timing difference with a threshold; and further to report information to a network node about one or more cells whose determined receive timing difference are within the threshold One or more embodiments herein provide solutions to ensure that the UE and/or system performance is not degraded regardless of whether the UE configured to operate in synchronized or unsynchronized DC mode. That is, one or more embodiments herein ensure efficient dual connectivity operation regardless of whether the UE operates in synchronized mode or unsynchronized mode.

One or more embodiments herein provide solutions to ensure that the network node receives information to a network node about one or more cells whose determined receive timing difference are within the threshold and thus a suitable cell for use with the UE.

One or more embodiments herein advantageously provide methods for a network node to decide on suitable dual connectivity operation mode for a certain UE i.e. synchronized or unsynchronized operation modes. In addition or alternatively, one or more embodiments also define methods that enable more efficient power consumption of the UE e.g. by alignment of DRX cycles for dual connectivity operation. In addition or alternatively, one or more embodiments also define efficient activation/deactivation time periods for SCell in dual connectivity. In addition or alternatively, one or more embodiments also enable the UE to provide suitable cells which can be used for DC operation according to the UE capability related to DC. This in turn enhances the overall UE and system performances especially in case of synchronized DC operation of the UE.

BRIEF DESCRIPTION OF DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

FIGS. 6a-6c illustrates implementations of a network node according to exemplifying embodiments.

FIGS. 7a-7c illustrates implementations of a wireless communication device according to exemplifying embodiments.

DETAILED DESCRIPTION

Figure 1:
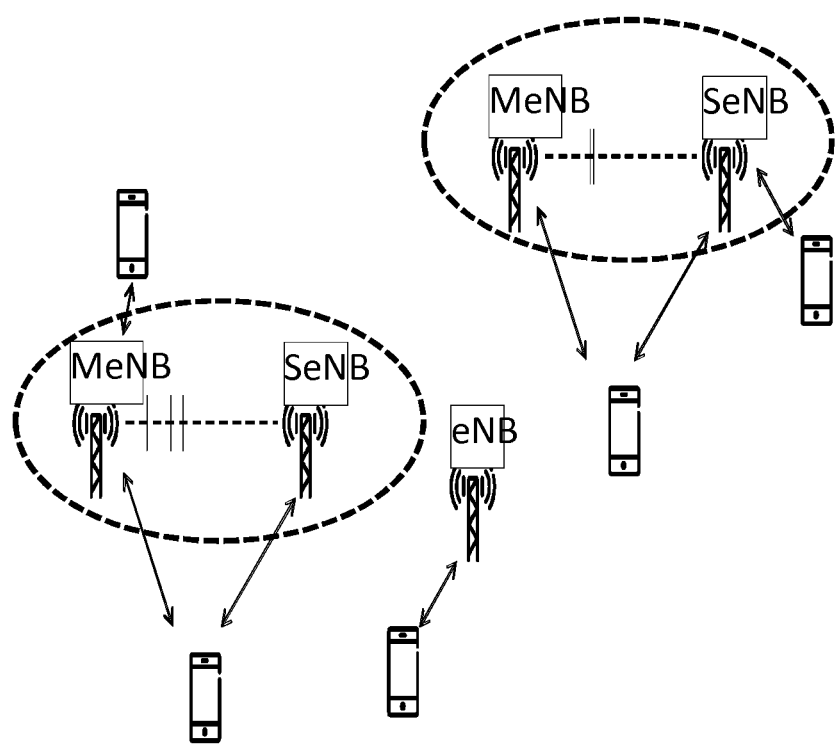
FIG. 1 illustrates dual connectivity

In the following description, the following terms are used:
MeNB (Main eNB): This is eNB to which the UE is connected as the main eNB-UE link. The MeNB may also be referred to as Master eNB or anchor node.
SeNB (Secondary eNB): This is the other eNB to which the UE is connected to or to which the UE may be connected to. The SeNB may also be referred to as booster node.
In some embodiments non-limiting term UE is used. The UE herein can be any type of wireless device capable of communicating, wireless communication device, with network node or another UE over radio signals. The UE may also be, radio communication device, target device, device to device (D2D) UE, machine type UE or UE capable of machine to machine communication (M2M), a sensor equipped with UE, tablet, mobile terminals, smart phone, laptop embedded equipped (LEE), laptop mounted equipment (LME), USB dongles, Customer Premises Equipment (CPE) etc.

In the following description, we use one MeNB and one SeNB for description; however, all the algorithms are also valid for one MeNB and more than one SeNBs.

Also in some embodiments generic terminology, "radio network node" or simply "network node (NW node)", is used. It can be any kind of network node which may comprise of base station, radio base station, base transceiver station, base station controller, network controller, evolved Node B (eNB), Node B, relay node, access point, radio access point, radio network point, Remote Radio Unit (RRU) Remote Radio Head (RRH) etc.

In some embodiments first node and second node are used, where first node can be MeNB and second node can be SeNB. The first node and second node may also be interchangeably called as first radio node and second radio node respectively or a first network node and a second network node respectively. In some embodiments CC allocation of the UE is done by the first node or by the second node or by any other network node. In some embodiment only the term node may be used which can be first or second node e.g. in case both first and second node can perform the same task.

In some embodiments yet third network node may be used. The third network node may be used for configuring or managing the first and/or second network node. Examples of the third network node are core network node, SON, O&M, OSS, another eNode B, or a master or central node. In some embodiment the first and the third network nodes or the second and the third network nodes may be the same.

In some embodiment yet another node called fourth network node may be used. The fourth network node may be neighboring to the first and/or the second network nodes. The fourth network node can be used as MeNB or SeNB for the UE configured in DC operation.

In some embodiments UE capability in terms of the maximum number of CCs that the UE can use for dual connectivity operation (i.e. for CA of CCs from different eNBs i.e. MeNB and SeNB) is used. In some embodiment such capability refers to the maximum total number of CCs from all network nodes involved in DC operation of the UE. In some embodiment such capability refers to the maximum number of CCs per network node involved in DC operation of the UE. In some embodiments such capability information is obtained in the network node based on pre-defined rule, information received from the UE, information received from another network node or any combination thereof.

A component carrier (CC) also interchangeably called as carrier, PCC or SCC is configured at the UE by the network node using higher layer signaling e.g. by sending RRC configuration message to the UE. The configured CC is used by the network node for serving the UE on or as the serving cell (e.g. on PCell, PSCell, SCell etc) of the configured CC. The configured CC is also used by the UE for performing one or more radio measurements (e.g. RSRP, RSRQ etc) on the cells operating on the CC e.g. PCell, SCell or PSCell and neighboring cells.

In some embodiment the term determining is used and it may also be obtaining, receiving, detecting, identifying etc, information or parameter etc.

The following sections describe the relevant methods in the network node and UEs according to some embodiments.

Although embodiments are described generally for "dual connectivity", the embodiments are readily extendable to "multiple connectivity" involving more than two simultaneous connections.

Since dual connectivity operation involves two non-co-located transmitters (i.e. MeNB and SeNB), one of the main issues related to UE receiver performance is the maximum receive timing difference ($\Delta t$) of the signals from MeNB and SeNB received at the UE receiver. This gives rise to two cases of DC operation with respect to the UE: synchronized DC operation and unsynchronized DC operation.

Case 1: The synchronized operation herein means that the UE can perform DC operation provided the received time difference ($\Delta t$) between the signals received at the UE from the component carriers, CCs, belonging to the MCG and SCG are within a certain threshold e.g. ±30 μs.

Case 2: The unsynchronized operation herein means that the UE can perform DC operation regardless of the received time difference ($\Delta t$) between the signals received at the UE from the CCs belonging to the MCG and SCG e.g. for any value of $\Delta t$.

Maximum receive timing difference ($\Delta t$) at the UE consists of two components, namely:
(1) Relative propagation delay difference between MeNB and SeNB,
(2) Tx timing difference due to synchronization levels between antenna connectors of MeNB and SeNB, and
(3) Delay due to multipath propagation of radio signals With respect to the relative propagation delay difference a maximum of 30.26 μs is designed for worst case non-co-located CA coverage case. 30.26 μs corresponds to signal propagation distance of just over 9 km. In dense urban scenarios, maximum misalignment due to propagation delay that can be seen is around 10 μs. This is linearly related to relative physical distance between the nodes. So, we have a large amount of timing misalignment margin which may not be required due to distance between nodes, which means that there is a possibility to actually relax the requirement even higher than certain transmit timing misalignment (i.e. synchronization accuracy between MeNB and SeNB), e.g. 3 μs. 3 μs is chosen here due to the fact that co-channel synchronization accuracy requirement for TDD systems is 3 μs (which means that the tightest requirement that can be achieved is 3 μs).

With respect to the transmit timing difference between MeNB and SeNB, the synchronized case essentially means that MeNB and SeNB transmit timing need to be synchronized up to certain level of time accuracy, while unsynchronized case provides a random value for synchronization accuracy (i.e. anything up to 1 ms), which is higher than the accuracy required in synchronized case. It is worth noting here that, the receive timing difference referred to is the received timing misalignment between two received signals at the UE. In other words, this is not the transmit timing mismatch levels between the MeNB and SeNB.

In case of dual Tx/Rx and also non-ideal backhaul, it is possible that the MeNB and SeNB are not synchronized to each other. Dual Tx/Rx means that we will potentially have separate power amplifiers, PAs, for separate links, thus no strict synchronization requirement is needed. This is the case 2 as mentioned above. Define requirements for the unsynchronized case, may also work for synchronized case.

With respect to delay due to multipath radio environment, the received time difference of radio signals from MeNB and SeNB may also incorporate additional delay introduced by the multipaths due to the characteristics of the radio environment. For example in typical urban environment the delay spread of multiple paths received at the UE may typically be in the order of 1-3 μs. However, wide areas like in sub urban or rural deployment scenario, the channel delay spread due to multipath effect of the signals observed at the UE is relatively smaller e.g. less than 1 μs.

Figure 2:
FIG. 2 shows a method to be performed by a network node, according to an exemplifying embodiment.

An exemplifying method embodiments performed by a network node will be described with reference to FIG. 2. FIG. 2 illustrates a method performed by a network node that may be operable in a wireless communication network supporting dual connectivity. The method is suitable e.g. for deciding a suitable dual connectivity operation mode for a certain WCD e.g. synchronized or unsynchronized operation modes.

The method comprises determining 201 the extent to which a wireless communication device requires different signals received from different non-co-located radio network points to be synchronized in order to operate with multiple connectivity. The method further comprises deciding 202 whether to configure the WCD to operate with multiple connectivity, based on said determination.

As shown, the method comprises determining the extent to which a wireless communication device requires different signals received from different non-co-located radio network points to be synchronized in order to operate with multiple connectivity. When operating with multiple connectivity, the device maintains simultaneous connections to different radio network points which employ independent radio resource scheduling and feedback signaling. The points do so because they are connected by a non-ideal backhaul that has finite backhaul delay, rendering tight coordination between the points infeasible. In any event, such determination may be made using any approach described in step 1 of section "Initiating dual connectivity operation considering UE synchronization capability".

The determining 201 may comprise receiving from the WCD, a WCD capability information indicating the capability of the WCD to operate in synchronized and/or in a unsynchronized multiple connectivity.

Regardless, the method further comprises deciding whether to configure the device to operate with multiple connectivity, based on the above determination. In some embodiments, for example, if the WCD does not require different received signals to be synchronized to any extent (i.e., the device is capable of unsynchronized multiple connectivity), the network node decides to configure the device to operate with multiple connectivity.

Thus, when the WCD can operate in unsynchronized multiple connectivity, the network node further comprises configuring the device to operate with multiple connectivity.

On the other hand, if the device requires the different received signals to be synchronized to at least some extent, the network node decides to configure the device to operate with multiple connectivity only if the amount of synchronization that the device requires can be provided by two or more radio network points to which the device can simultaneously connect.

Thus, when the WCD requires the different received signals to be synchronized, the network node further comprises configuring the WCD to operate with multiple connectivity only if the amount of synchronization that the WCD requires can be provided by two or more radio network nodes.

In this regard, the network node in some embodiments identifies the particular amount of synchronization required, if not already identified in the determination. That is, in some embodiments the above determination simply entails determining whether the device requires at least some synchronization, without identifying the particular amount of synchronization required. In these embodiments, therefore, the network node may further identify the particular amount of synchronization (e.g., in the form of a particular maximum RTD value that the device supports). Regardless, for each of one or more different candidate groups (e.g., pairs) of radio network points to which the device is able to simultaneously connect, the network node determines the amount of synchronization that the points in the candidate group can provide (E.g., in terms of a RTD between signals received by the device from the points in the candidate group). The network node may perform this determination using any of the approaches described in step 3 of section "Initiating dual connectivity operation considering UE synchronization capability". If at least one of the candidate groups can provide at least the amount of synchronization required by the device, the network node configures the device with multiple connectivity (e.g., configures the device to maintain simultaneous connections to the points in that candidate group).

Figure 3:
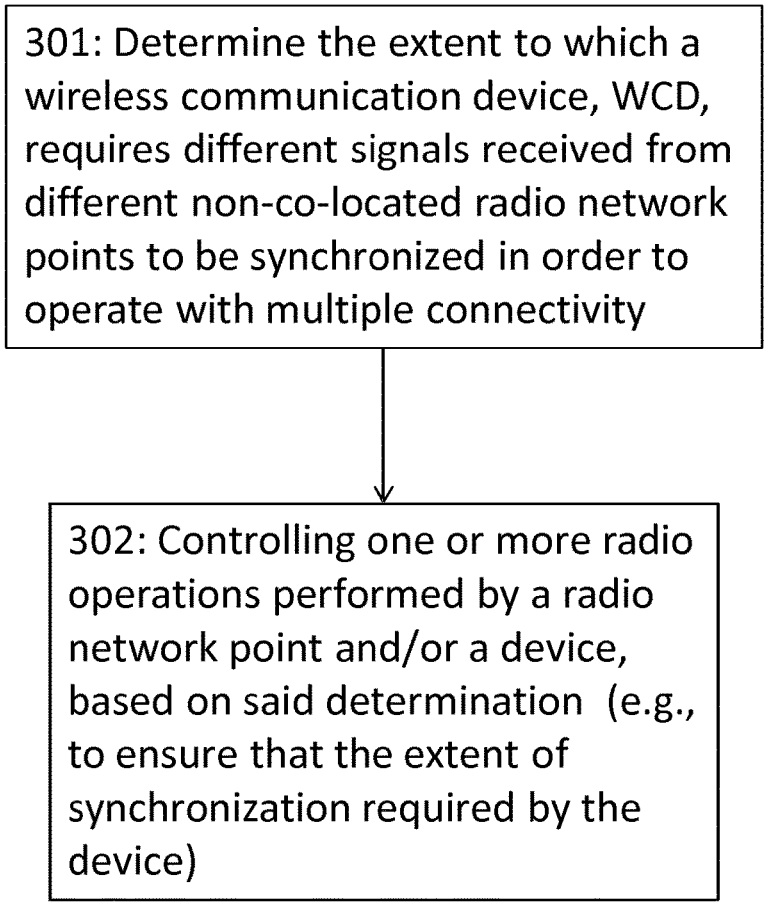
FIG. 3 shows a method to be performed by a network node, according to an exemplifying embodiment.

Additionally or alternatively to the embodiments above, one or more embodiments herein generally including a method performed by a network node in a wireless communication system, as shown in FIG. 3.

As shown, the method includes determining the extent to which a wireless communication device requires different signals received from different non-co-located radio network points to be synchronized in order to operate with multiple connectivity. When operating with multiple connectivity, the device maintains simultaneous connections to different radio network points which employ independent radio resource scheduling and feedback signaling. The points do so because they are connected by a non-ideal backhaul that has finite backhaul delay, rendering tight coordination between the points infeasible. In any event, such determination may be made using any approach described in step 1 of section "Initiating dual connectivity operation considering UE synchronization capability".

Regardless, the method further comprises controlling one or more radio operations performed by one of the radio network points and/or the device, based on said determination.

In some embodiments, for instance, the network node does so as needed to ensure that the extent of synchronization required by the device is provided by radio network points to which the device simultaneously connects. The network node in this case may for example control the transmit timing (e.g., DL frame timing) with which one or more radio network points transmit signals (see e.g., section "Adapting DC related radio operations based on UE synchronization capability". 1). Additionally or alternatively, the network node may control handover of the device to a particular radio network point that can provide the required extent of synchronization (see e.g., section "Adapting DC related radio operations based on UE synchronization capability". 2).

In other embodiments, the network node does so as needed to coordinate (at least in a limited capacity) parameters related to inter-frequency measurement and/or sleep time periods across different ones of the radio network points (see e.g., sections "Adapting DC related radio operations based on UE synchronization capability". 3 and "Adapting DC related radio operations based on UE synchronization capability". 5).

In one or more embodiments the network node may perform a number of operations related to dual connectivity.

The steps performed in the network node, according to some embodiments, may be:
 Obtaining information about UE capability whether it is able to support the first capability (e.g. synchronized operation) or a second capability (e.g. unsynchronized operation)
 determining or estimating the receive timing difference (RTD) between reception of signals at the UE from serving BS (e.g. MeNB) and at least a second BS (e.g. SeNB)
 Deciding whether to configure the UE in dual connectivity for communication with serving and second BSs or not, based on UE capability and determined RTD
 Based on the above decision(s), performing one or more operations related to dual connectivity Methods in a Network Node to Initiate Dual Connectivity Operation and Adapt Procedure(s) Accounting for Synchronization Level A network determines UE capability related to synchronized and/or unsynchronized DC operation of UE and decides whether to initiate DC operation and adjusts one or more radio procedures depending upon whether the UE is configured to operate in synchronized or unsynchronized DC. The method is typically performed by the first network node but it may also be performed by the second network node or even third network node or even it may involve more than one network nodes. The method is elaborated in the following sections:
 Method of initiating or configuring UE with DC operation based on UE synchronization capability
 Adapting DC related radio operations based on UE synchronization capability Initiating Dual Connectivity Operation Considering UE Synchronization Capability In this embodiment, the network node (e.g. first network node or second network node or even a third network node that manages the first and/or second network nodes) makes the decision on the acceptability of UE request regarding initiating the dual connectivity operation.

1. The network node obtains the UE capability information, which information can be related to the capability of the UE to operate in synchronized and/or unsynchronized manner for DC operation. In one example the UE capability information may contain explicit information such as whether the UE is capable of synchronized and/or unsynchronized DC operation along with level of synchronization needed (e.g. $\Delta t \leq 30$ μs) for synchronized operation. In yet another example the level of synchronization needed (e.g. $\Delta t \leq 30$ μs) for synchronized operation can be pre-defined. In yet another example the UE capability information related to the synchronized and/or unsynchronized DC operation may be implicitly determined by the network node. As an example the UE transceiver architecture (aka radio architecture, RF frontend architecture, number or size of radio chains etc.) supported by the UE for DC operation can implicitly depict whether the UE can perform synchronized and/or unsynchronized DC operation. For example if the UE is capable of single Rx/Tx (i.e. single transceiver) for DC operation, then the network node may assume that the UE supports only synchronized operation. In this case as well the value of $\Delta t$ may be pre-defined or indicated by the UE. On the other hand if UE indicates that it is capable of multiple Rx/Tx (i.e. two or more transceivers) for DC operation, then the network node may assume that the UE supports unsynchronized operation. It may also be that by default the DC capability is assumed to support only the synchronized DC operation. Therefore only when supporting the unsynchronized DC operation, the UE indicates this implicitly or explicitly. The UE capability may also be associated with the frequency bands and/or band combinations supported by the UE for DC operation e.g. different synchronization levels for different band combinations. A further example of implicit determination of UE synchronization capability would be if the UE is capable of inter band CA in the Downlink. Inter band CA capability is an implicit indication of potential synchronized DC capability. If a UE can combine non co-located carriers from the same eNB (for example macro cell+remote radio head) this could mean that the UE is also capable of combining carriers from different eNB and this would correspond to synchronized CA. The network node may obtain the above mentioned UE capability information partly or fully by one or more of the following means:
 UE capability information based on pre-defined rule e.g. by default the DC capable UE is capable of synchronized DC operation,
 UE capability information stored in the network node;
 UE capability information received from another network node e.g. from core network node, a neighboring network node such as neighboring BS etc.
 UE capability information received from the UE e.g. transmitted by the UE proactively at initial setup or sent by the UE in response to a request received from the network node etc. The UE capability may be sent/received based on the E-UTRAN initiating the procedure to a UE in RRC_CONNECTED when it needs UE radio access capability information. Therefore the UE may signal the capability information to the network node (e.g. eNode B) via RRC signaling. This may be in response to the reception of the UECapabilityEnquiry message by the UE. The UE may also signal the capability information to the core network node (e.g. MME) via Non Access Stratum (NAS) signaling during initial setup or in idle mode.
 The result of a test or an explicit operative configuration order where the network configures DC operation for a particular UE and monitors and stores the outcome.

This could be used in general but in particular for UEs which has only signaled that UE is capable of inter band CA in the Downlink. This can be used to strengthen the knowledge of UE capabilities only derived implicitly.

2. The network node configures the UE to operate in DC based on the obtained UE DC operational capability in step 1 as follows:

If the UE is capable of performing DC under unsynchronized operation then the network node configures the UE for performing DC operation. The DC configuration herein may comprise of configuring the UE with at least one serving cell from the first network node and one serving cell from the second network node e.g. PCell and PSCell from MeNB and SeNB respectively. The network node may also additionally configure the UE with one or more SCell(s) from MeNB and SeNB. In order to enhance the UE and/or system performance of DC operation, the network node may also adjust one or more parameters or adapt radio operations as described in section "Adapting DC related radio operations based on UE synchronization capability".

If the UE is capable of performing DC under only synchronized operation then the network node prior to configuring the UE for performing DC operation, determines the expected received time difference (RTD) of signals from the first and the second network nodes at the UE as described in Step 3 below.

3. The network node determines or estimates the Receive Timing Difference (RTD) between the reception signals (i.e. signals received or expected to be received) at the UE from the serving BS (i.e. the first network node) and a second (or third or more) network node. The network node may estimate the RTD using one or more of the following means:

Based on the locations of the DC capable UE, the first network node and the second network node. Their locations can be used for estimating the propagation delay of signal transmission between: the UE and the first network node (D1) and the UE and the second network node (D2). The difference between D1 and D2 would correspond to RTD. The UE location can be determined by any location method e.g. A-GNSS (e.g. A-GNSS), enhanced cell ID, fingerprinting which generally requires UE signal measurements (e.g. RSRP, RSRQ etc). The locations of the first network node and the second network node can be pre-determined and stored.

Based on UE measurement report such as reference signal time difference (RSTD). It is the time difference between signals received from a pair of cells at the UE. It is used for determining UE location based on OTDOA positioning method. The UE sends RSTD In this case RTD is equal to RSTD.

Based on timing advance (TA) or propagation delay measured: between the UE and the first network node (e.g. TA1) and between the UE and the second network node (e.g. TA2). The RTD is the difference between TA1 and TA2.

4. If the RTD estimated in Step 3 is within the value supported by the UE capable of synchronized DC operation (e.g. RTD≤Δt) then the network node may decide to configure the UE (i.e. UE capable of synchronized DC operation) for DC operation. Also in synchronized operation, in order to enhance the UE and/or system performance of DC operation, the network node may also adjust one or more parameters or adapt radio operations as described in section "Adapting DC related radio operations based on UE synchronization capability".

Note that embodiments in section "Initiating dual connectivity operation considering UE synchronization capability" may be implemented alone, or in combination with other embodiments herein (e.g., in combination with embodiments in section "Adapting DC related radio operations based on UE synchronization capability").

Adapting DC Related Radio Operations Based on UE Synchronization Capability

The network node may adapt one or more of the following operations or apply adjustment of one or more parameters in order to enhance the performance of DC operation. Each of the subsections under section "Adapting DC related radio operations based on UE synchronization capability" may be implemented independently from each other or in combination with each other. Similarly, each of the subsections under section "Adapting DC related radio operations based on UE synchronization capability" may be implemented independently from or in combination with other embodiments herein in other sections.

Adjusting Transmit Timing Mismatch Between MeNB and SeNB

In one alternative the method performed by the network node may comprise adjusting a transmit timing of either of the different radio network points based on the determined extent to which the WCD requires different signals received from different non-co-located radio network points to be synchronized This may be performed by, a first network node determines the transmit timing mismatch with respect to a second (or third or more) network node and vice versa. The transmit timings herein may refer to the start timings of the DL radio frames of the first and the second network nodes. The mismatch herein refers to the difference in their DL frame timings. For example the first network node may receive information about the transmit timing of the second network node from the second network node or vice versa. The first and the second network nodes may also receive the information about the transmit timing of the other network node from a third network node. The first network node may also have a pre-determined information about the transmit timing of the second network node and vice versa.

a first network node decides to adjust its own transmit timing mismatch with respect to a second (or third or more) network node and vice versa. The network node adjusting its frame timing may also inform about the adjustment to other network nodes e.g. first network node indicates this to the second network node or vice versa. The adjustment may be performed for one or more of the following reasons:

to ensure RTD at the UE for synchronized DC operation is within a certain limit e.g. within the UE capability limit such as within 30 μs.

based on the above adjustments, a first (or second or third) network node further decide on usability of either synchronized or unsynchronized dual connectivity for the mentioned UE.

For example if the UE supports only synchronized DC operation then the network node may configure the UE for DC operation if the timing adjustment lead to a value of RTD at the UE within its capability limit.

In another example based on the above measurement of transmit timing mismatch between a first and second (or third or more) node, the first node decides not to perform the adjustment of the transmit timing, and thus only be available for unsynchronized DC operation. Therefore the network node may decide to configure the DC operation for the UE which is capable of unsynchronized DC operation.

a first (or second or third) network node may also inform the UE of its decision regarding above mentioned decision. For example the UE may be informed that the frame start timings of the first and/or the second network nodes have been adjusted. The UE may also be provided with the amount of adjusted either explicitly or implicitly (e.g. amount of adjustment is pre-defined).

Performing Handover of the UE to a New Network Node Based on Synchronization Requirements In one alternative the method performed by the network node may comprise initiating a cell change of the WCD to a radio network point based on the determined extent to which the WCD requires different signals received from different non-co-located radio network points to be synchronized In another embodiment, 1. A network node (e.g. first network node or serving network node if UE is not currently in DC operational mode) decides to perform cell change (e.g. handover) of a UE from a second node to a another network node (e.g. fourth network node) based on the synchronization requirement (i.e. RTD requirement) of the UE for DC operation, etc.

As an example, a UE can be capable only for synchronized DC operation. However the first and second network nodes involved in supporting the UE in DC operation cannot ensure that their transmitted signals arrive at the UE within the UE capability limit e.g. RTD≤30 μs. Therefore the current serving nodes (first and the second network nodes) are unable to support the UE in DC operation.

2. The decision whether and when to perform cell change operation can be initiated by the network node (e.g. first or second or any serving network node) based on one or more of the following:

Information that the existing or the candidate first and the second network nodes used or to be used for DC operation cannot ensure synchronized operation;

Recommendation received from another network node. For example the second network node informs the first network node about the need for releasing the UE to another network node, thus a first network node initiates the cell change (e.g. handover).

3. The network node prior to doing cell change determines a suitable target network node (e.g. fourth network node) based on one or more of the following mechanisms:

Pre-determined knowledge of the network nodes which are geographically closest to the first or the second network nodes.

Recommendation received from the UE. For example the UE autonomously or based on the request received from the network node, identifies or determines the suitable one or more cells (which are served by the network nodes) for DC operation. The determination is based on for example received timing of cells, signal measurements etc., as described in another embodiment in section "Method in UE to initiate or recommend dual connectivity operation".

If there are more than one potential target network nodes for the cell change, then the network node may select the one whose signal measurement performed by the UE is strongest.

4. A network node then configures the UE to change cell (e.g. handed over) to (or connected to) another network node (e.g. fourth network node as determined in Step 3 above) for being able to be served in DC mode.

Adjusting the DRX Cycle Between Nodes

In one alternative the method performed by the network node may comprise adjusting a discontinuous reception parameter based on the determined extent to which the WCD requires different signals received from different non-co-located radio network points to be synchronized LTE has a number of power saving mechanisms, some of them are mentioned below:

1. Discontinuous Reception (DRX)
2. Discontinuous Transmission (DTX): It is the DRX equivalent at the UE transmitter
3. Both reducing transceiver duty cycle while in active operation
4. DRX also applies to the RRC_IDLE state with a longer cycle time than active mode A UE is dimensioned to monitor the PDCCH. When the UE is ON, then it monitors the PDCCH, while in DRX mode, it remains in power saving mode.

The RRC sets a cycle where the UE is operational for a certain period of time when all the scheduling and paging information is transmitted, this is the ON duration. On other times, the eNodeB knows that the UE is completely turned off and is not able to receive anything. This is the DRX time. Except when in DRX, the UE radio must be active to monitor PDCCH (to identify DL data). During DRX, the UE radio can be turned off.

The DRX/DTX functionality is an effective way to reduce the UE's battery power usage, but at the same time introduces further constraints in the scheduler's tasks. The immediate consequence of them is an average increase of packets delivery delays. The short DRX/DTX represents a further attempt to exploit the inactivity periods of UE to save even more power. This further saving could be remarkable with certain types of traffic, but can also be very limited with others, like VoIP.

As mentioned earlier, DRX is configured by the RRC mechanisms; it may have long or short "off" durations. The transition between long DRX and short DRX is determined by the eNB (MAC commands) or by the UE based on an activity timer.

The application of long or short DRX largely depends on the application. A lower duty cycle could be used during a pause in speaking during a voice over IP call. When speaking resumes, this results in lower latency.

Similarly, for more non-real time services, e.g. data communication, for packets arriving at a lower rate than voice services, the UE can be off for a longer period of time. For packets arriving more often, the DRX interval is reduced during this period.

Typically all UEs are in DRX and the ON duration can be as small as 1 ms. There is common DRX for PCell and SCell in CA. That means PCell and SCell reception times should be well within DRX ON. Alternatively the NW has to adapt DRX On duration.

The first and the second network nodes configure the UE in DC operation with DRX cycles independently. Each network node may also configure the UE with 2 DRX cycles: short DRX and long DRX cycles.

As an example a first set of the DRX cycles and a second set of the DRX cycles are configured for receiving signals from the serving cells served by the first network node and from the serving cells served by the second network node respectively.

In this embodiment the network node (e.g. first, second or third network nodes) may adjust one or more parameters related to the one or both of the first set of DRX cycles and/or of the second set of DRX cycles. Examples of the DRX related parameters are ON duration timer, DRX cycle length, inactivity timer etc.

In one example the adjustment of the DRX related parameters and the type of the parameter to be adjusted may be triggered based on whether the DC operation is synchronized or unsynchronized. For example when the DC operation is unsynchronized then the network node may configure a longer value of the ON duration timer in at least the first or the second set of the DRX cycles e.g. 20 ms or longer. This is to allow the UE to activate the receiver once during first and second set of the DRX cycles for receiving signals from both the first and the second network nodes. In yet another example if the UE operates in synchronized DC mode then the network node may decide to configure the UE with a shorter ON duration timer e.g. 2 ms.

The network nodes can also coordinate among themselves (e.g. between first and the second network nodes over X2) to decide whether to align the DRX related parameters and also the DRX parameters and their values to be aligned. In yet another exemplary implementation the third network node may decide whether one or more DRX related parameters should be aligned or not and indicate this to the first and/or to the second network nodes. If the parameters are to be aligned then the third network node may also inform the first and/or the second network nodes with the values of DRX parameters to be aligned for the UE in DC operation. The third network node may also inform the UE about the alignment of the DRX related parameters or configure the UE with the said adjusted DRX related parameters. Additionally or alternatively the first and/or the second network nodes may also configure the UE with the said adjusted parameters related to the DRX.

Activation and Deactivation Time Period Based on Synchronization Levels

A first network node configuring and implicitly activating a cell belonging to a second (or a third or more) network node to a first UE blindly, i.e. not having said UE reporting the cell before configuration, determines the expected time needed for said UE to activate the cell based on synchronization status for the second (or third or more) network node relative to the first network node. In case, the first network node has provided information to said UE on that the second (or third or more) network node is synchronized to the first network node on a radio frame basis, the first network node may for instance expect the activation time to be X ms and adjusts e.g. a timer for detection of failed activation accordingly. If on the other hand the first network node does not provide such information regarding the second network node to the UE, or provides information on that the second network node is unsynchronized with the first network node, the first network node may expect the activation time to be Y>X ms, and adjusts said timer accordingly.

In an example embodiment, X may be 89 ms and Y may be 180 ms, but also other values may be used.

In a further embodiment, in case the first network node has acquired information on the radio conditions in the proximity of the first UE, e.g. via reporting of mobility measurements from a second, a third, etc UEs in the same area, the first network node may take such information into account when determining the expected activation time. As an example embodiment, in good radio conditions the first network node may expect the activation of the first UE for a cell under a second network node to be shorter than when in bad radio conditions. The information on radio conditions may also be based on historic information on UE activation time for that area.

A first network node may further take synchronization status for a second (or third or more) network node into account when determining the expected interruption time due to reconfiguration of RF when activating or deactivating a cell under the second (or third or more) network node. In case information has been provided to the UE on that a second network node is synchronized on radio frame level to the first network node, the first network node may expect interruption time similar to legacy CA (1 ms or 5 ms; 3GPP 36.133 section 7.7). However, if such information has not been provided to the UE, or it has been provided to the UE that the second network node is unsynchronized to the first network node, the first network node may expect the activation to cause an interruption that is longer than in legacy CA. For instance, each interruption may be extended by 1 ms to cater for misaligned subframe timing (e.g. 2 ms or 6 ms).

The expected interruption time has an impact on the expected BLER, and hence incorrect expectations may have an impact on the radio link adaptation, leading to more robust encoding (MCS) than called for by the radio conditions and as a result a reduced throughput both on user level and system level.

Measurement Gap Configuration Based on Synchronization Level

In one alternative the method performed by the network node may comprise adjusting a measurement gap configuration based on the determined extent to which the WCD requires different signals received from different non-co-located radio network points to be synchronized A second network node may take synchronization status to a first network node into account when configuring measurement gaps that are to be aligned with said kind of gaps in said first network node. In case the second network node is aware of being synchronized with the first network node, it may configure overlapping gaps of same length as used in said first network node. If on the other hand it is unaware, or aware of not being synchronized with said first network node, it may configure measurement gaps that are longer (1 or 2 ms longer) than for those used in said first network node (6 ms) to take the misalignment into account and secure that the measurement gap on all carriers simultaneously is 6 ms minus tolerances due to differences introduced by non-collocated cells under the same network node (e.g. up to 30.3 µs) and differences between TAGs (e.g. 31.5 µs).

In case the second network node cannot use extended gaps e.g. due to lacking support in the standard (currently only gap length 6 ms is supported for LTE), said second network node can avoid impact on system throughput and mobility by taking the synchronization status into account. If known by the second network node that it is synchronized to the first network node, it can follow legacy procedures regarding scheduling the UE immediately before and after a measurement gap. However if synchronization status is unknown to said second network node, or it is known that said second network node is unsynchronized with the first network node, the second network node may avoid scheduling the UE immediately before and/or after the measurement gap. For example the first and/or second network nodes may assume that the length of each gap is 8 ms instead of 6 ms. The network node may instead during these additional subframes (e.g. 2 subframes) schedule UEs which are not configured to operate in DC or UEs which are configured to operate in synchronized DC mode.

Switching the UE from Unsynchronized to Synchronized and Vice Versa

Some embodiments is performed occasionally or periodically so as to enable the network node to dynamically switch the device from employing synchronized multiple connectivity to employing unsynchronized multiple connectivity, and vice versa. In at least some embodiments, the network node preferentially configures the device for unsynchronized multiple connectivity.

In this embodiment the network node (e.g. first network node and/or network node) may switch the UE from synchronized to unsynchronized mode of the UE's DC operation or vice versa.

For example the UE supporting unsynchronized mode can be configured to operate in synchronized mode. In synchronized mode the RTD of signals from the first and the second network nodes at the UE should be within certain limit e.g. 30 μs.

The UE supporting both unsynchronized and synchronized modes of DC operation can also be configured from synchronized to unsynchronized mode or vice versa.

However for the UE that only supported synchronized mode of DC operation cannot be configured to unsynchronized mode.

The network node (e.g. first network node) may decide to change the DC mode of operation based on one or more of the following criteria:

- Network node determines RTD for a UE in DC operation periodically or occasionally and decides based on the determined DC whether the UE needs to move from synchronized to unsynchronized mode of DC operation or vice versa. For example if RTD is larger than a threshold, then the network node may operate the UE under unsynchronized mode. In this case the parameters such as measurement gaps can be independently configured by the first and the second network nodes without the need for any alignment.
- If the time difference between the DL frame transmit timings of the first and the second network nodes can be maintained within a smaller value (e.g. ≤3 μs) then the network node may switch the UE to synchronized mode of DC operation.

Method in UE to Initiate or Recommend Dual Connectivity Operation

Figure 4:
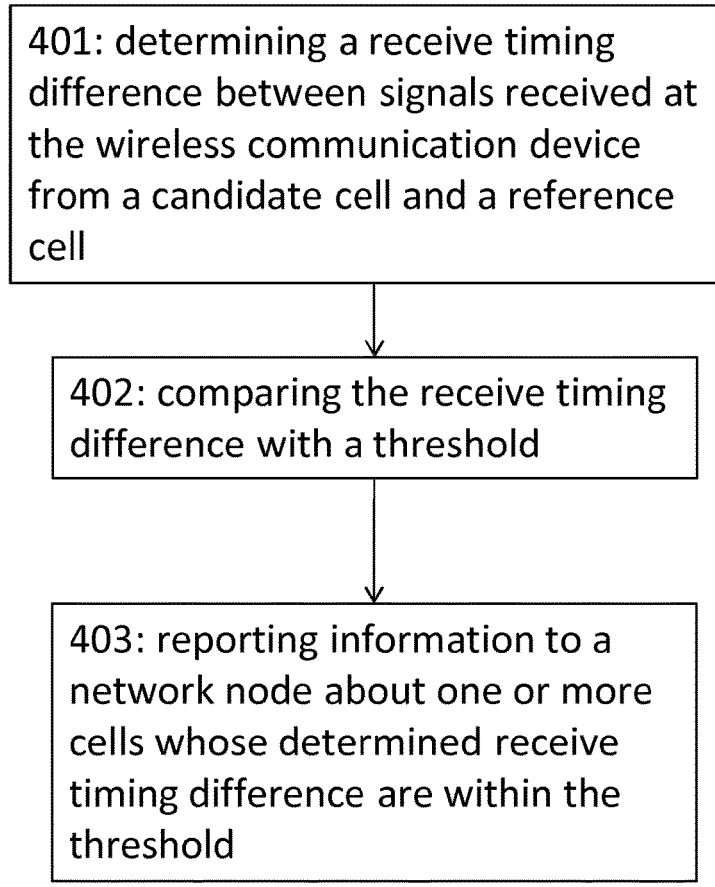
FIG. 4 shows a method to be performed by a wireless communication device according to an exemplifying embodiment.

In this embodiment the WCD autonomously or in response to request received from the network node determine candidate cells for DC and indicate this to the network node. This is elaborated below:

FIG. 4 illustrates a method in a wireless communication device. The method comprises determining 401 a receive timing difference between signals received at the wireless communication device from a candidate cell and a reference cell. The method further comprises comparing 402 the receive timing difference with a threshold. The method further comprises reporting 403 information to a network node about one or more cells whose determined receive timing difference are within the threshold.

The steps performed at the WCD, may according to some embodiments comprise obtaining information (autonomously triggered or based on request received from a network node) to determine one or more cells that are suitable for DC operation in unsynchronized and/or synchronized modes. Such information may thus be obtaining information indicating to the WCD that candidate cells should be determined. Alternatively or in addition the method may comprise triggering the reporting information to the network node autonomously or by a request from the network.

Further the method may comprise comparing the timing difference (RTD) of signals received at the UE from a candidate cell and a reference cell with a threshold, wherein the threshold is pre-defined, configured by the network node or based on UE capability and wherein the reference cell is pre-defined, configured by the network node or autonomously decided by the UE;

Further the method may comprise deciding based on the said comparison one or more candidate cells which are suitable for synchronized or unsynchronized DC operation modes;

Further the method may comprise transmitting information (e.g. recommended list of cells) about one or more cells that are suitable for synchronized and/or unsynchronized DC operation modes The information transmitted to the network node may comprise a cell identifier identifying the one or more cells whose determined receive timing difference are within the threshold.

The reference cell is in one example a serving cell or a strongest cell as measured by the WCD or a cell with the shortest propagation delay as measured by the WCD. The serving cell is the cell serving the WCD.

The threshold may pre-defined or configured by the network node or based on a WCD capability, said WCD capability indicates the extent to which the WCD requires different signals received from different cells to be synchronized in order to operate with the different cells. The capability may be based on the number of transmitters and/or receivers supported by the WCD.

UE Autonomous Determination of Candidate Cells for DC Operation

In one aspect of this embodiment the UE which is capable of DC operation performs the following steps:

- Autonomously determines RTD between a reference cell and one or more neighbor cells e.g. RTD1 between the reference cell and a first neighbor cell and RTD2 between the reference cell and a second neighbor cell. The timing of each cell is determined during the existing (known) cell identification procedure;
- Compares the determined values of the RTDs with a threshold e.g. 30 μs;
- Reports or transmits information about one or more cells whose determined RTDs are within the threshold. The transmitted information comprises for example the cell identifiers of the cells and an indication that these cells are feasible for synchronized DC operation with respect to the reference cell. The information may further comprise of carrier frequency of each indicated cells e.g. EARFCN of the cell. The UE may determine whether it is capable of synchronized DC operation explicitly based on its capability (e.g. supports only synchronized operation) and/or based on its transceiver architecture (e.g. UE supports only single Rx/Tx or does NOT support 2 or more Rx/Tx chains for DC operation); and
- Further (optionally) transmits information about the cells which are not suitable for synchronized operation (e.g. whose RTD is found to be above the threshold).

The step of the autonomous determination of the candidate cells for DC operation can be triggered based on one or more of the following criteria:

If the RTD between the existing synchronized DC operation (i.e. with respect to first and the second network nodes) is above certain threshold e.g. 28 μs.

If the UL and/or DL reception performance in case of existing synchronized DC operation becomes worse than their respective threshold. Examples of performance criteria are user throughput, user bit rate, signal quality etc.

A cell to be considered by the UE as the reference cell can be:
pre-determined;
autonomously selected by the UE or
configured by the network node e.g. first network node.

Examples of the reference cell are:
One of the currently serving cells e.g. PCell, SCell or PSCell etc.
Another example of the reference cell is the cell whose signal strength measured by the UE is the strongest e.g. strongest or largest value of RSRP and/or RSRQ.
Yet another example is the cell whose propagation delay with respect to the UE is the shortest.

UE Based Network Assisted Determination of Candidate Cells for DC Operation

In this embodiment the UE is explicitly configured by the network node (e.g. first network node and/or second network node and/or third network node):
to identify one or more cells which are feasible for DC operation in synchronized and/or unsynchronized mode. The UE is also configured with the information about the candidate cells among which the UE is to identify the said one or more feasible cells. The feasibility criteria is based on comparison between RTD with the threshold as described in section "UE autonomous determination of candidate cells for DC operation". The UE may also be configured with the threshold or the threshold may be pre-defined or the UE may choose it autonomously based on its capability; and
to signal the information related to the identified one or more said feasible cells for DC operation to the network node e.g. cell ID, EARFCN of the cells, whether they are feasible for synchronized and/or synchronized operation etc.

The UE upon receiving the request determines the RTD between the reference cell and the cells which are indicated by the network node. The definition of the reference cell is the same as described in section "UE autonomous determination of candidate cells for DC operation". The UE determines the cell to be feasible for synchronized DC operation provided its RTD with respect to the reference cell is within the threshold. The UE then signals the information about cells which are feasible for synchronized DC operation and/or for unsynchronized DC operation to the network node.

Use at Network Node of UE Determined Candidate Cells for DC Operation

In one alternative the method performed by a network node further comprising receiving information from the WCD about one or more cells whose determined receive timing difference are within a threshold, wherein said receive timing difference is between signals received at the wireless communication device from a candidate cell and a reference cell and further base the deciding on the received information.

In this embodiment the network node that receives information about one or more cells which are feasible for DC operation (synchronized DC operation and/or for unsynchronized DC operation modes) use the said information for one or more tasks as follows:

Network node may decide to configure the UE in synchronized DC operation or unsynchronized DC operation depending upon UE recommendation;

Network node may decide to configure the UE in synchronized DC operation or unsynchronized DC operation by combining the UE recommendation and also the assessment done by the network node itself. For example the network node may decide to configure the UE with synchronized DC operation provided UE recommended cell(s) and the cell(s) determined by the network node are the same i.e. suitable for synchronized DC operation;

Network node may store this information for collecting statistics and for using this information for configuring the UE in DC operation at a future time;

Network node may forward this information to another network node.

Hardware Implementations

The methods and techniques described above may be implemented in wireless communication devices and/or network nodes. Above, in association with describing the method embodiments, it is exemplified in which nodes in an LTE system the methods are intended to be implemented. Corresponding nodes in other communication systems may be denoted differently.

Figure 5:
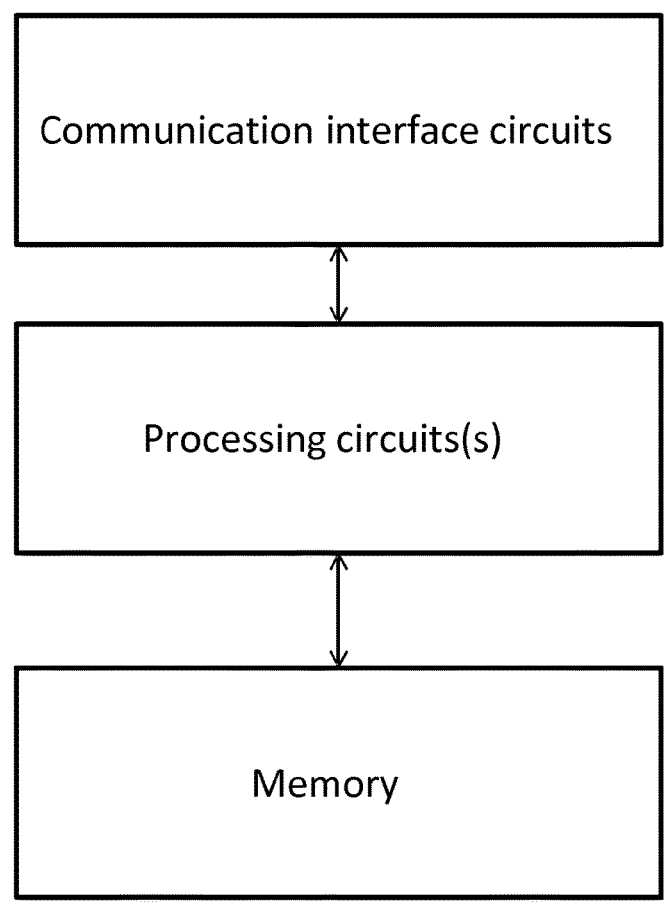
FIG. 5 illustrates implementations of a network node or a wireless communication device according to exemplifying embodiments.

In view of the above modifications and variations, those skilled in the art will appreciate that the FIG. 5 shows an example network node configured according to one or more embodiments herein. Those skilled in the art will also appreciate that FIG. 5 also illustrates an example wireless communication device (e.g., UE) configured as described above (e.g., in section "Method in UE to initiate or recommend dual connectivity operation").

The network node comprises communication interface circuits for communicating with one or more other nodes. In some embodiments where the network node is a radio network node, for instance, the interface circuits comprise a transceiver for communication over an air interface with a radio node in a wireless communication network. Regardless, the network node also comprises processing circuits for performing processing described herein, and memory for storing program code and data needed for operation. The processing circuits may comprise one or more processors, hardware circuits, firmware, or a combination thereof. Memory may comprise one or more volatile and/or non-volatile memory devices. Program code for controlling operation of the network node is stored in a non-volatile memory, such as a read-only memory or flash memory. Temporary data generated during operation may be stored in random access memory. The program code stored in memory, when executed by the processing circuit, causes the processing circuit to perform the methods shown above.

Network Node, FIGS. 6*a-c*

An exemplifying embodiment of a first network node, such as the one exemplified as illustrated in a general manner in FIG. 6*a*. The network node 600 is configured to perform at least one of the method embodiments described above, e.g. with reference to any of FIG. 2-3. The network node 600 is associated with the same technical features, objects and advantages as the previously described method embodiments. The network node will be described in brief in order to avoid unnecessary repetition.

The network node may be implemented and/or described as follows:

The network node 600 may be configured to support multiple connectivity and to be operable in a communication network supporting multiple connectivity. The network node 600 comprises processing circuitry 601 and a communication interface 602. The processing circuitry 601 is configured to determine the extent to which a wireless communication device, WCD, requires different signals received from different non-co-located radio network points to be synchronized in order to operate with multiple connectivity. The processing circuitry 601 is further configured to decide whether to configure the WCD to operate with multiple connectivity, based on said determination. The communication interface 602, which may also be denoted e.g. Input/Output (I/O) interface, includes a network interface for sending data to and receiving data from other network nodes.

The processing circuitry 601 could, as illustrated in FIG. 6b, comprise processing means, such as a processor 603, e.g. a CPU, and a memory 604 for storing or holding instructions. The memory would then comprise instructions, e.g. in form of a computer program 605, which when executed by the processing means 603 causes the network node 600 to perform the actions described above.

An alternative implementation of the processing circuitry 601 is shown in FIG. 6c. The processing circuitry here comprises a determining unit 606, configured to cause the network node to determine the extent to which a wireless communication device, WCD, requires different signals received from different non-co-located radio network points to be synchronized in order to operate with multiple connectivity. The processing circuitry further comprises a deciding unit 607, configured to decide whether to configure the WCD to operate with multiple connectivity, based on said determination.

The network node described above could be configured for the different method embodiments described herein such as: being configured to receive from the WCD, a WCD capability information indicating the capability of the UE to operate in synchronized and/or in a unsynchronized multiple connectivity; or alternatively or in addition being configured to configuring the UE on how to operate; or alternatively or in addition being configured to adjust any of the procedures discussed above; or alternatively or in addition being configured to receive information from a WCD about one or more cells whose determined receive timing difference are within a threshold.

The network node 600 may be assumed to comprise further functionality, for carrying out regular network node functions.

Wireless Communication Device, FIG. 7a-7c

An exemplifying embodiment of a wireless communication device, such as the one exemplified as a UE, and denoted "UE" above, is illustrated in a general manner in FIG. 7a. The wireless communication device will also here be denoted UE, as an example. The UE 700 is configured to perform at least one of the method embodiments described above, e.g. with reference to FIG. 4. The UE 700 is associated with the same technical features, objects and advantages as the previously described method embodiments. The UE will be described in brief in order to avoid unnecessary repetition.

The UE may be implemented and/or described as follows:

The WCD 700 may be configured to support multiple connectivity and to be operable in a communication network supporting multiple connectivity. The UE 700 comprises processing circuitry 701 and a communication interface 702. The processing circuitry 701 is configured to, determine a receive timing difference between signals received at the wireless communication device from a candidate cell and a reference cell. The processing circuitry 701 is further configured to, compare the receive timing difference with a threshold. The processing circuitry 701 is further configured to, report information to a network node about one or more cells whose determined receive timing difference are within the threshold. The communication interface 702, which may also be denoted e.g. Input/Output (I/O) interface, includes a network interface for sending data to and receiving data from other network nodes.

The processing circuitry 701 could, as illustrated in FIG. 7b, comprise processing means, such as a processor 703, e.g. a CPU, and a memory 704 for storing or holding instructions. The memory would then comprise instructions, e.g. in form of a computer program 705, which when executed by the processing means 703 causes the UE 700 to perform the actions described above.

An alternative implementation of the processing circuitry 701 is shown in FIG. 7c. The processing circuitry here comprises a determining unit 706, configured to determine a receive timing difference between signals received at the wireless communication device from a candidate cell and a reference cell. The processing circuitry further comprises a comparing unit 707, configured to cause the UE to, compare the receive timing difference with a threshold. The processing circuitry further comprises a reporting unit 708, configured to cause the UE to, report information to a network node about one or more cells whose determined receive timing difference are within the threshold.

The UE described above could be configured for the different method embodiments described herein, such as to trigger the report of information to the network node autonomously or by a request from the network.

The UE 700 may be assumed to comprise further functionality, for carrying out regular UE functions.

The steps, functions, procedures, modules, units and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules, units and/or blocks described above may be implemented in software such as a computer program for execution by suitable processing circuitry including one or more processing units. The software could be carried by a carrier, such as an electronic signal, an optical signal, a radio signal, or a computer readable storage medium before and/or during the use of the computer program in the network nodes. At least part of the network nodes described above may be implemented in a so-called cloud solution, referring to that the implementation may be distributed, and the network nodes therefore may be so-called virtual nodes or virtual machines.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, and/or any suitable programmable logic circuitry such as one or more Field Programmable Gate Arrays, FPGAs, or one or more Programmable Logic Controllers, PLCs. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It should also be understood that it may be possible to re-use the general processing capabilities of any conventional device or unit in which the proposed technology is implemented. It may also be possible to re-use existing software, e.g. by reprogramming of the existing software or by adding new software components.

The embodiments described above are merely given as examples, and it should be understood that the proposed technology is not limited thereto. It will be understood by those skilled in the art that various modifications, combinations and changes may be made to the embodiments without departing from the present scope. In particular, different part solutions in the different embodiments can be combined in other configurations, where technically possible.

It should be noted that although terminology from 3GPP LTE has been used in this disclosure to exemplify the invention, this should not be seen as limiting the scope of the invention to only the aforementioned system. Other wireless systems which support a broadcast service may also benefit from exploiting the ideas covered within this disclosure.

When using the word "comprise" or "comprising" it shall be interpreted as non-limiting, i.e. meaning "consist at least of".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

ABBREVIATIONS

DC Dual connectivity
MeNB Master eNode B
SeNB Secondary eNode B
PSCell Primary SCell
PCC Primary component carrier
PCI Physical cell identity
PSS Primary synchronization signal
RAT Radio Access Technology
RRC Radio resource control
RSCP Received signal code power
RSRP Reference Signal Received Power
RSRQ Reference Signal Received Quality
RSSI Received signal strength indication
RSTD Reference signal time difference
OTDOA Observed time difference of arrival
SCC Secondary component carrier
SIB System information block
SON Self-organizing networks
SSS Secondary synchronization signal
TDD Time division duplex
UARFCN UMTS Absolute Radio Frequency Channel Number
HO Handover
UE User equipment
RNC Radio Network Controller
BSC Base station Controller
PCell Primary Cell
SCell Secondary Cell
MCG Master Cell Group
SCG Secondary Cell Group

The invention claimed is:

1. A method in a wireless communication device (WCD), the method comprising:
   determining a receive timing difference between signals received at the WCD from a candidate cell and a reference cell;
   comparing the receive timing difference with a threshold;
   reporting information to a network node about one or more cells whose determined receive timing difference are within the threshold;
   receiving, in response to the information, a first configuration from the network node to adapt radio operations at the WCD; and
   adapting a radio operation at the WCD based on the configuration.

2. The method of claim 1, wherein the information reported to the network node comprises a cell identifier identifying the one or more cells whose determined receive timing difference are within the threshold.

3. The method of claim 1, wherein the reference cell is a serving cell or a strongest cell as measured by the WCD or a cell with the shortest propagation delay as measured by the WCD.

4. The method of claim 1, wherein the threshold is based on a WCD capability, the WCD capability indicating the extent to which the WCD requires different signals received from different cells to be synchronized in order to operate with the different cells.

5. The method of claim 4, where the WCD capability is based on the number of transmitters, the number of receivers supported by the WCD, or both.

6. The method of claim 1, further comprising triggering the reporting of the information to the network node autonomously or in response to a request from the network.

7. A wireless communication device (WCD) operable in a communication network supporting multiple connectivity, the wireless communication device comprising:
a communication interface; and
processing circuitry operatively connected to the communication interface and configured to:
determine a receive timing difference between signals received at the WCD from a candidate cell and a reference cell;
compare the receive timing difference with a threshold;
report information to a network node, via the communication interface, about one or more cells whose determined receive timing difference are within the threshold;
receive, in response to the information, a first configuration from the network node to adapt radio operations at the WCD; and
adapt a radio operation at the WCD based on the configuration.

8. The wireless communication device of claim 7, wherein the information reported to the network node comprises a cell identifier identifying the one or more cells whose determined receive timing difference are within the threshold.

9. The wireless communication device of claim 7, wherein the reference cell is a serving cell, or a strongest cell as measured by the WCD or a cell with the shortest propagation delay as measured by the WCD.

10. The wireless communication device of claim 7, wherein the threshold is pre-defined, or configured by the network node, or based on a WCD capability, the WCD capability indicating the extent to which the WCD requires different signals received from different cells to be synchronized in order to operate with the different cells.

11. The wireless communication device of claim 10, where the WCD capability is based on the number of transmitters, the number of receivers supported by the WCD, or both.

12. The wireless communication device of claim 7, wherein the processing circuitry is configured to trigger the report of the information to the network node autonomously or in response to a request from the network.

13. The method of claim 1, wherein the candidate cell includes a candidate network node for dual or multiple connectivity.

14. The method of claim 1, wherein the reported information comprises a list of multiple cells that are suitable for synchronized dual or multiple connectivity with respect to the reference cell in order for the WCD to operate in a multiple connectivity mode based on the comparing.

15. The method of claim 1, wherein the reported information comprises a list of multiple cells that are suitable for unsynchronized dual or multiple connectivity with respect to the reference cell based on the comparing.

16. The method of claim 1, wherein the method further comprises receiving a second configuration from a network node to operate with dual or multiple connectivity and wherein the determining, the comparing, and the reporting are responsive to receiving this second configuration.

17. The method of claim 16, wherein receiving the second configuration is responsive to the WCD transmitting information to the network node indicating a WCD capability, the WCD capability indicating the extent to which the WCD requires different signals received from different cells to be synchronized in order to operate with the different cells.

18. The method of claim 1, wherein the threshold is pre-defined, or configured by the network node.

19. The method of claim 1, wherein the reporting information to the network node comprises the WCD recommending handover or connectivity to a candidate cell; and the first configuration comprises a configuration to handover or connect to a network node.

20. The method of claim 1, wherein the receiving the first configuration comprises receiving a configuration for synchronized connectivity; and the adapting the radio operation comprises adapting the WCD to switch from unsynchronized connectivity to synchronized connectivity.

21. The method of claim 1, wherein the receiving the first configuration comprises receiving a configuration for unsynchronized connectivity; and the adapting the radio operation comprises adapting the WCD to switch from synchronized connectivity to unsynchronized connectivity.

22. The method of claim 1, wherein the first configuration is related to a discontinuous reception parameter; and the adapting a radio operation at the WCD comprises adapting discontinuous reception at the WCD.

23. The method of claim 1, further comprising the WCD triggering the reporting of the information to the network node autonomously based on the determined receive timing difference and/or a reception performance in uplink from or downlink to the WCD.

* * * * *

UNITED STATES PATENT AND TRADEMARK OFFICE
CERTIFICATE OF CORRECTION

PATENT NO. : 10,225,028 B2  
APPLICATION NO. : 14/763237  
DATED : March 5, 2019  
INVENTOR(S) : Rahman et al.

Page 1 of 1

It is certified that error appears in the above-identified patent and that said Letters Patent is hereby corrected as shown below:

In the Specification

In Column 3, Line 43, delete "e,g," and insert -- e.g, --, therefor.

In the Claims

In Column 24, Line 62, in Claim 5, delete "where the" and insert -- wherein the --, therefor.

In Column 25, Line 36, in Claim 11, delete "where the" and insert -- wherein the --, therefor.

Signed and Sealed this  
Twenty-fifth Day of June, 2019

Andrei Iancu  
*Director of the United States Patent and Trademark Office*